US008947022B2

(12) United States Patent
Shek

(10) Patent No.: US 8,947,022 B2

(45) Date of Patent: Feb. 3, 2015

(54) GARBAGE CONTAINER

(76) Inventor: Michael Shek, San Mateo, CA (US)

( * ) Notice: Subject to any disclaimer, the term of this patent is extended or adjusted under 35 U.S.C. 154(b) by 394 days.

(21) Appl. No.: 13/402,359

(22) Filed: Feb. 22, 2012

(65) Prior Publication Data

US 2013/0213965 A1 Aug. 22, 2013

(51) Int. Cl.
*H02P 1/00* (2006.01)

(52) U.S. Cl.
USPC .......... 318/139

(58) Field of Classification Search
USPC .......... 318/139; 220/200, 211, 260, 262, 263
See application file for complete search history.

(56) References Cited

U.S. PATENT DOCUMENTS 6,010,024 A 1/2000 Wang
6,774,586 B1 8/2004 Shih
6,812,655 B1 11/2004 Wang et al.
6,883,676 B2 4/2005 Lin
7,714,527 B2 5/2010 Wang et al.
7,750,591 B2 7/2010 Wang et al.
7,911,169 B2 3/2011 Wang et al.
2002/0011815 A1* 1/2002 Gaffney et al. .......... 318/560
2004/0252490 A1* 12/2004 Lin .......... 362/154
2007/0182551 A1* 8/2007 Yang et al. .......... 340/545.3
2007/0209846 A1* 9/2007 Wilson .......... 180/65.1
2010/0176128 A1* 7/2010 Nance .......... 220/211

FOREIGN PATENT DOCUMENTS

TW M265363 5/2005
TW M312517 5/2007
TW M316879 8/2007
TW 201103842 2/2011
TW 1352054 11/2011

* cited by examiner

*Primary Examiner* — Kawing Chan
(74) *Attorney, Agent, or Firm* — Muncy, Geissler, Olds & Lowe, P.C.

(57) ABSTRACT

A garbage container of the present invention includes a main body, a sensor, a pedal, a connecting member, a driving mechanism, and a lid. A receiving opening is formed on a top of the main body. The pedal contacts with the sensor. The lid connects with the connecting member. When the pedal is pressed or released, a resistance of the sensor changes, and then the sensor sends a signal to a controller. After receiving signals, the controller drives the connecting member to elevate or to descend via the driving mechanism. When the pedal is pressed, the connecting member is elevated, and the lid is lifted to enable the receiving opening to communicate with an external space. When the connecting member is descended, the lid covers the receiving opening to unenable the receiving opening to communicate with the external space.

8 Claims, 8 Drawing Sheets

GARBAGE CONTAINER

BACKGROUND OF THE INVENTION

1. Field of the Invention

The present invention relates to a garbage container, more specifically to a garbage container which is able to be opened easily by pressing or stepping on.

2. Description of the Prior Art

A conventional garbage container usually has a lid on a opening of the container to prevent odors diffusing or mosquitoes breeding due to the garbage therein. However, when the lid is independent from the container, a user should remove the lid from the container and keep holding the lid before disposal of garbage, and it is troublesome to a user who has had garbage in his hand.

A garbage container with a liftable lid is thereby disclosed, wherein the garbage container can be triggered by pluralities of means. The most common way to trigger the lid to lift is by stepping on a pedal, as disclosed in TW M265363, TW M312517, U.S. Pat. No. 6,010,024, and U.S. Pat. No. 6,883,676. The pedal is disposed on the container near ground, and the pedal connects to the lid via two linking rods or other similar structure. When the pedal is stepped on, the lid is lifted due to the lever principle. On the contrary, when the pedal is released, the lid falls and covers the opening of the container. However, this kind of structure brings about pluralities of problems. For example, if the lid is bulky and heavy, a user who doesn't have sufficient strength such as a female or a disable is difficult to step on entirely. Besides, due to the limitation of the operation of linking rods, the pedal has to be disposed on a fixed and specific position, so the pedal can not be placed at a preferable position to accommodate to different situations.

A garbage container with an automatically liftable lid is disclosed in TW I352054, TW M316879, TW 201103842, U.S. Pat. No. 6,774,586, U.S. Pat. No. 6,812,655, U.S. Pat. No. 7,714,527, U.S. Pat. No. 7,750,591, and U.S. Pat. No. 7,911,169. The container has an IR induction sensor or an electrostatic induction sensor. When an object approaches the sensor, the lid is triggered to lift by the sensor. Although the automatically opening container is convenient, it also has some problems. For instance, the sensor and operation structure have to be disposed near the opening to facilitate the lid lifting, so the opening is not quite large enough to receive disposals. Moreover, the sensor detects anytime, so the sensor consumes electricity anytime too. On the other hand, the lid opens when an object approaches the sensor, so the lid may open even if a person just passes by. Also, when malfunctioning, the sensor may open automatically even if no object approaches.

SUMMARY OF THE INVENTION

The main object of the present invention is to provide a garbage container which can be opened more easily. Also, the garbage container is more electricity-saving and has a larger opening to receive disposals.

To achieve the above and other objects, a garbage container of the present invention includes a main body, a controller, a sensor, a pedal, a connecting member, a driving mechanism, a power supply, and a lid.

A receiving opening is formed on a top of the main body. An opening is formed on a wall of the main body near ground. The controller can be an IC board and is disposed on a bottom of the main body. A resistance of the sensor changes when pressure the sensor received changes, and then the sensor sends a signal to the controller. The pedal is partially inserted into the opening and contacts with the sensor. When the pedal is stepped on or pressed, pressure the sensor received changes. The connecting member is able to move between a first position near ground and a second position away from ground. The driving mechanism includes a motor, a decelerating mechanism, and an arm. An end of the arm connects to the decelerating mechanism, and the other opposite end of the arm connects to the connecting member. The arm is triggered to pivot by the motor and the decelerating mechanism to enable the connecting member to move between the first and the second positions. The power supply provides energy to the controller and the driving mechanism. The lid is disposed outside of the receiving opening and is able to pivot relatively to the receiving opening. When the connecting member is at the first position, the lid covers on the receiving opening to segregate the receiving opening from an external space. When the connecting member is at the second position, the lid is lifted to enable the receiving opening to communicate with the external space.

Thereby, the garbage container of the present invention is more energy-saving and easier to use. Also, a larger receiving opening is provided to facilitate disposal.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
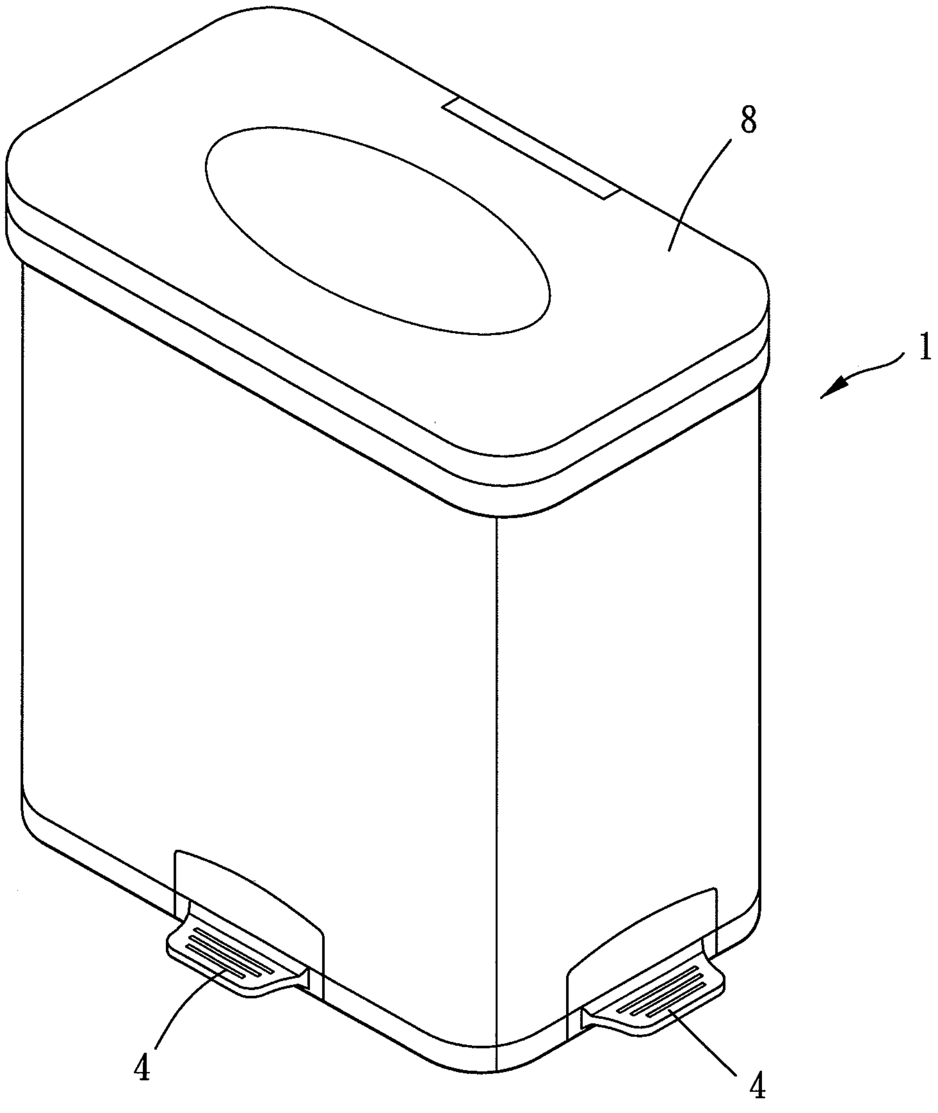
FIG. 1 is a stereogram drawing showing a garbage container of the present invention.
Figure 2:
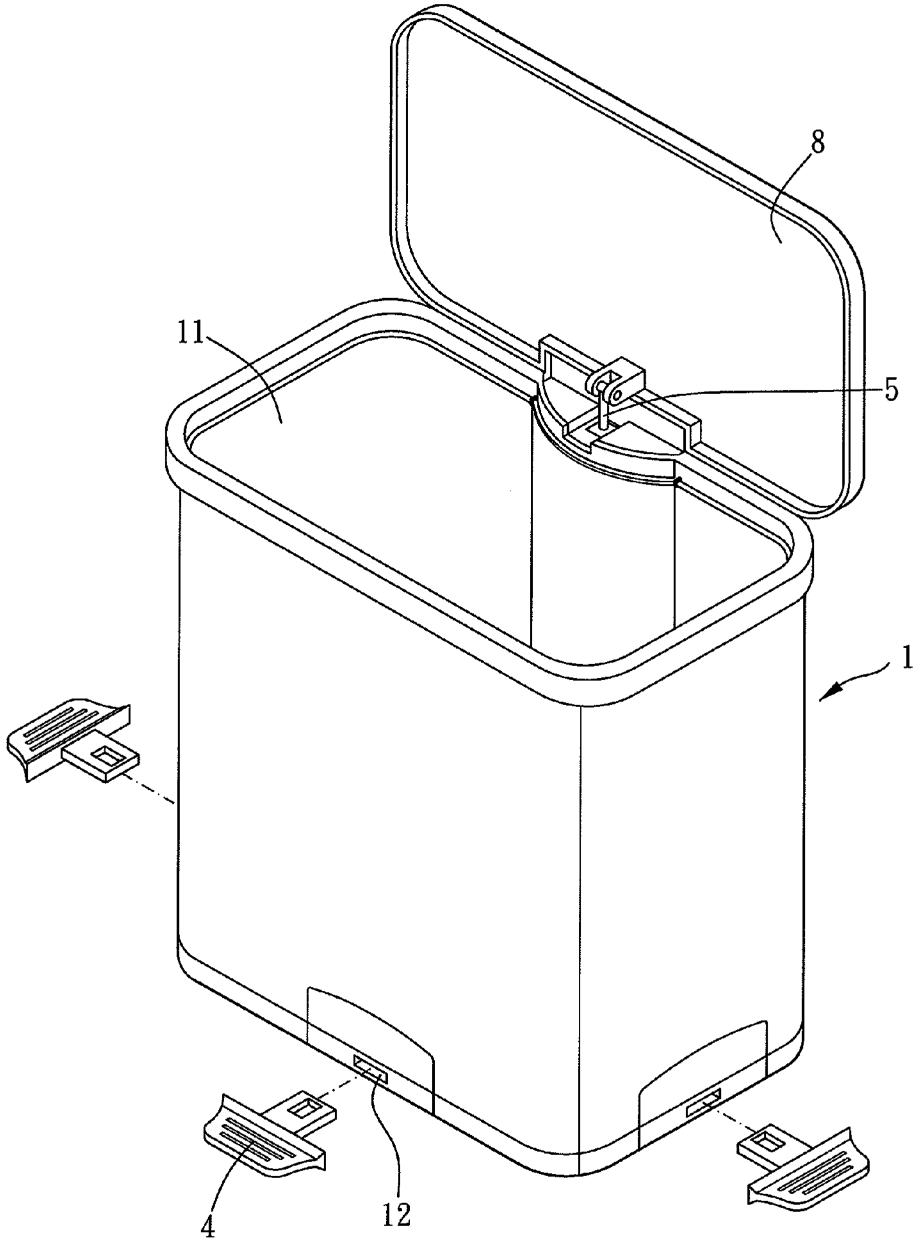
FIG. 2 is a breakdown drawing showing a garbage container of the present invention.

Please refer to FIG. 1 to FIG. 5 for a major embodiment of the present invention. The garbage container of the present embodiment includes a main body 1, a controller 2, at least a sensor 3, at least a pedal 4, a connecting member 5, a driving mechanism 6, a power supply 7, and a lid 8.

A receiving opening 11 is formed on a top of the main body 1, and at least an opening 12 is formed on a wall of the main body 1 near a bottom of the main body 1. The main body 1 has first room 13 and a second room 14 which are segregated from each other. The first room 13 communicates with the receiving opening 11. The controller 2, the connecting member 5, the driving mechanism 6, and the power supply 7 are located in the second room 14.

The controller 2 can be an IC board and is disposed on the bottom of the main body 1. A resistance of the sensor 3 changes when pressure the sensor 3 received changes. And then the sensor 3 sends a signal to the controller 2. In the major embodiment of the present invention, the sensor 3 is fixed in the main body 1. The pedal 4 is detachably inserted into the opening 12 and the sensor 3 to enable a user to step on. In other possible embodiment of the present invention, pluralities of the sensors 3 and pluralities of the pedals 4 corresponding to the sensors 3 are provided. The main body 1 also has pluralities of openings 12 to enable the sensors 3 and the pedals 4 to be disposed on at least one side of the main body 1.

The connecting member 5 is able to move between a first position near ground and a second position away from ground. More specifically, the connecting member 5 is a rod and is able to move longitudinally.

The driving mechanism 6 includes a motor 61, a decelerating mechanism 62, and an arm 63. The motor 61 is controlled by signals sent by the controller 2. An end of the arm 63 connects with the decelerating mechanism 62, and the other opposite end of the arm 63 connects with the connecting member 5. The arm 63 is able to pivot when being driven by the motor 61 and the decelerating mechanism 62 to enable the connecting member 5 to move between the first and the second positions. The power supply 7 provides energy to the controller 2 and the driving mechanism 6. For the few requirement of energy, the power supply 7 can be just a battery assembly.

The lid 8 is disposed on the outside of the receiving opening 11 and is capable of pivoting relatively to the receiving opening 11. A position of fringe of the lid 8 connects to an end away from the arm 63 of the connecting member 5. When the connecting member 5 is at the first position, the lid 8 covers the receiving opening 11 to segregate the receiving opening 11 from an external space. When the connecting member 5 is at the second position, the lid 8 pivots away from the receiving opening 11 to enable the receiving opening 11 to communicate with the external space.

Figure 3:
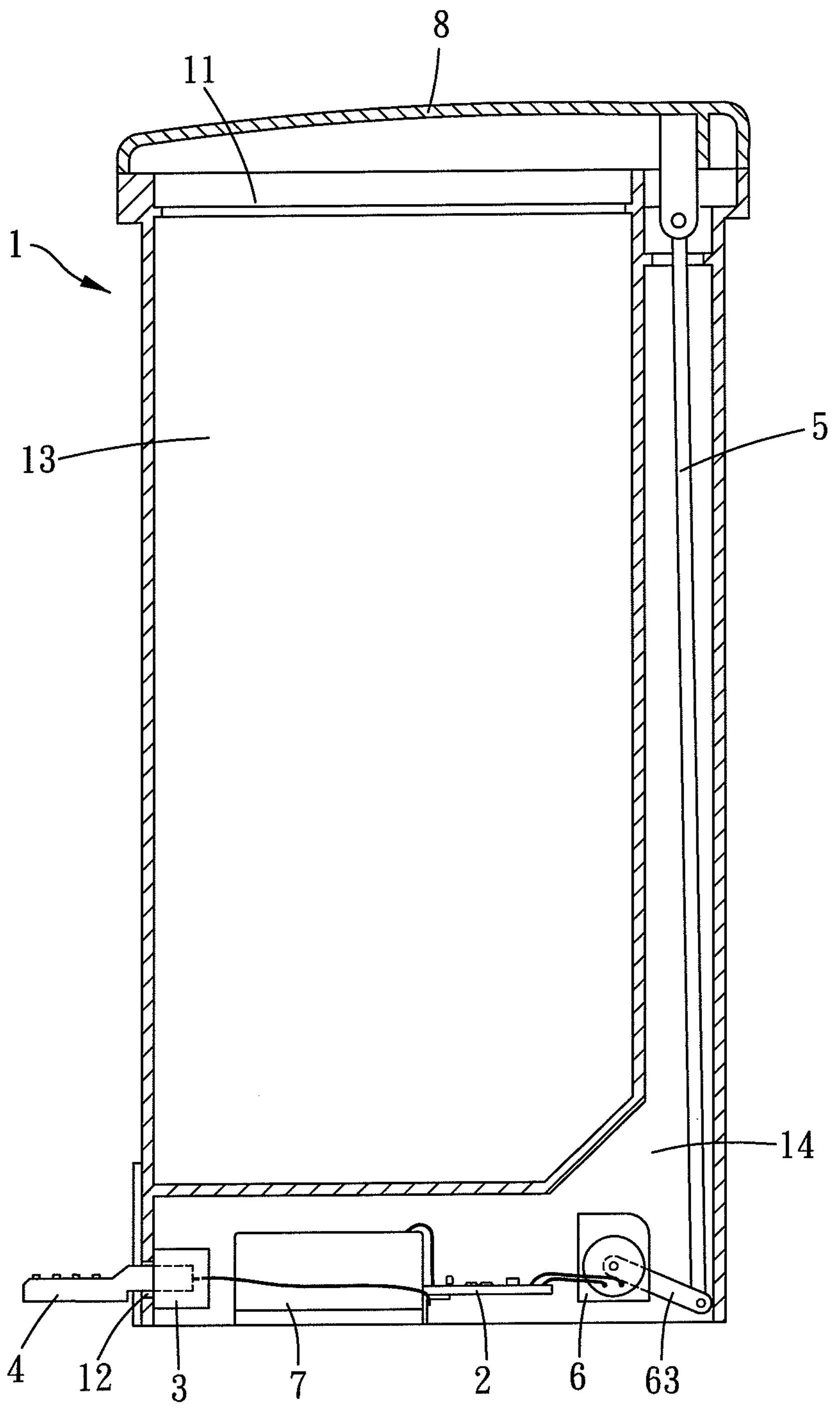
FIG. 3 is a cross-section drawing showing a garbage container of the present invention.
Figure 4:
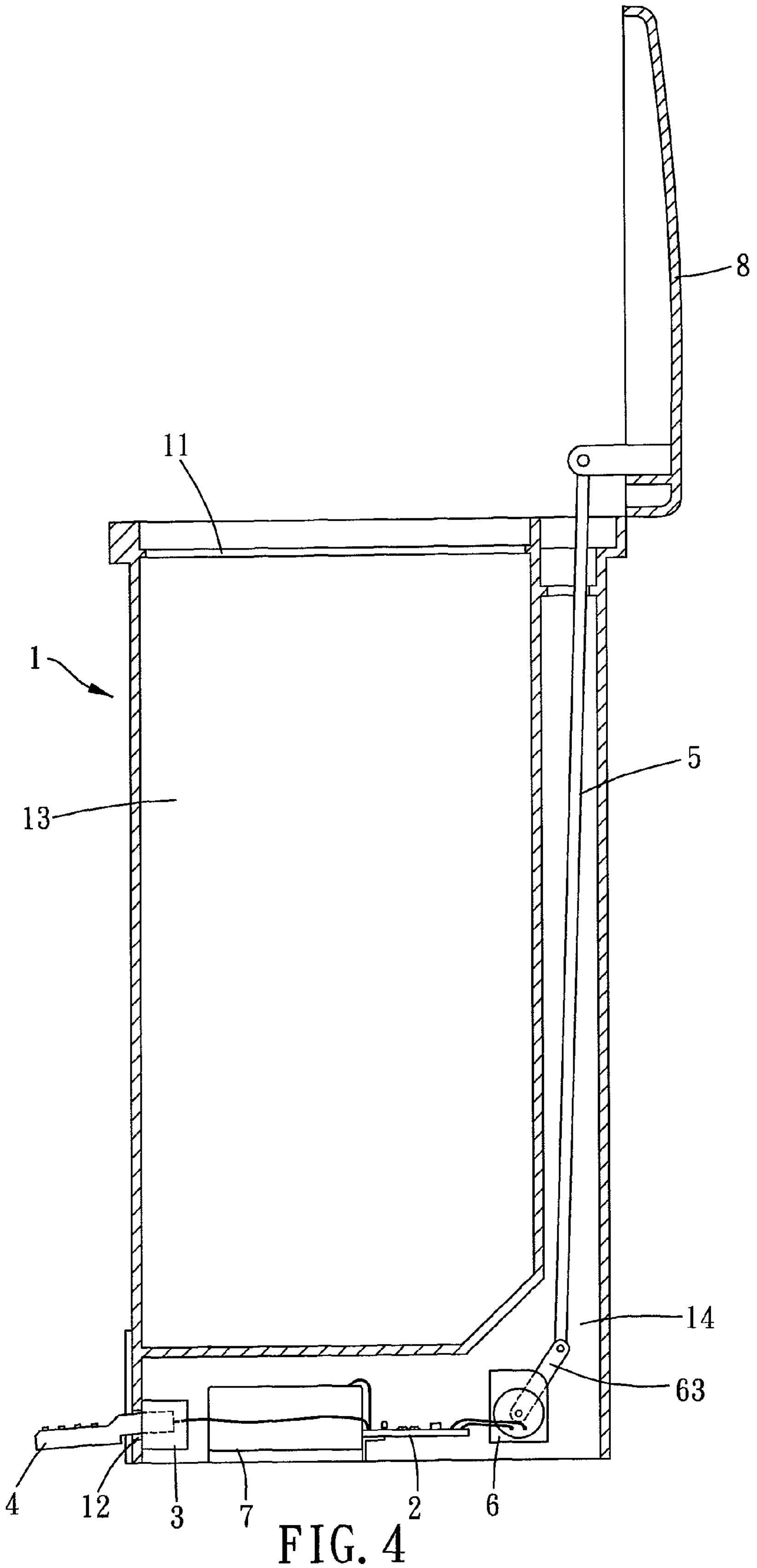
FIG. 4 is an operation illustration showing a garbage container of the present invention.
Figure 5:
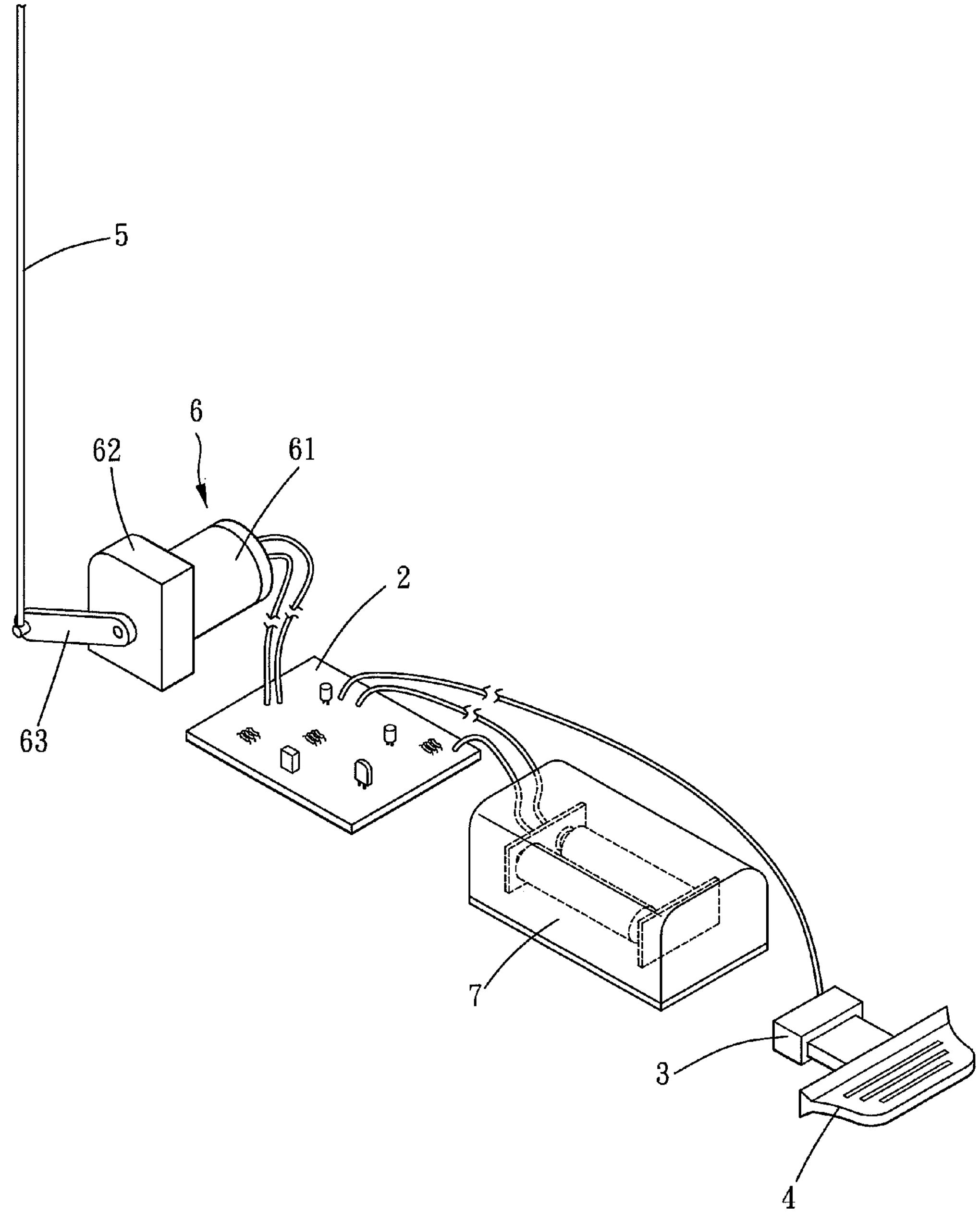
FIG. 5 is an illustration showing an inside of a main body of a garbage container of the present invention.

Please refer to FIG. 3. When the pedal 4 is not pressed or stepped on, pressure the sensor 3 received doesn't change, so the resistance of the sensor 3 doesn't change too. Thus, the sensor 3 doesn't send signals to the controller 5, and the connecting member is at the first position to keep the lid 8 closed. Referring to FIG. 4, a contrary condition is illustrated. When the pedal 4 is pressed or stepped on, pressure the sensor 3 received changes, so the resistance of the sensor 3 is changed too. Thus, the sensor 3 sends a signal to the controller 2 to trigger the driving mechanism 6. The motor 61 and the decelerating mechanism 62 drive the arm 63 to elevate, and then the connecting member 5 is elevated to the second position. Thus, the lid 8 is lifted and opened. More particularly, the controller 2 is able to control persisting time of the lid 8 opening. A user just has to steps on the pedal 4 lightly but not to keep stepping on the pedal 4, and the lid 8 can be kept opening for seconds or tens of seconds. After the opening period of the lid 8, the controller 2 stops sending signals, so the arm 63 descends. Thus, the connecting member 5 is descended to the first position to close the lid 8.

Figure 6:
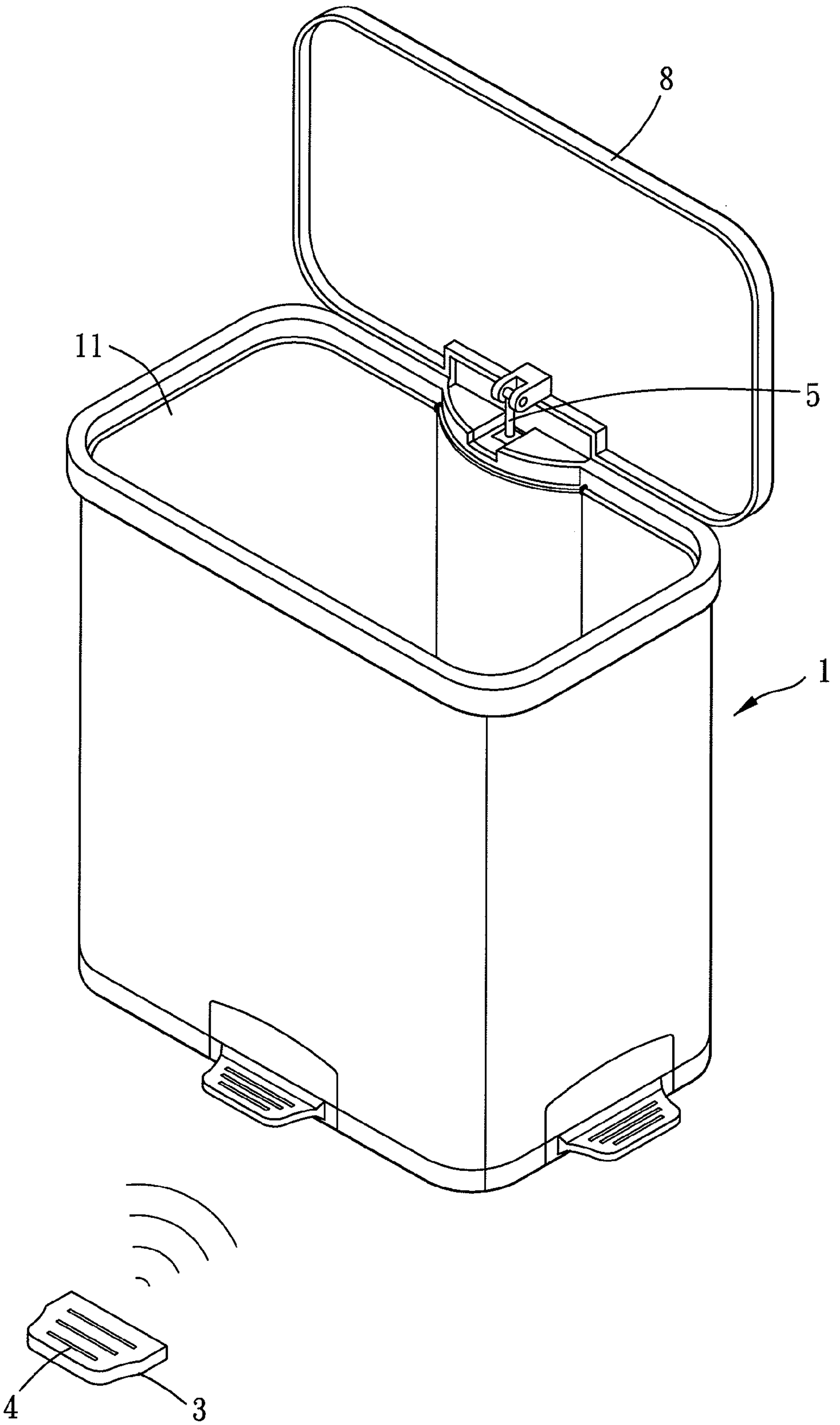
FIG. 6 is an illustration showing a second embodiment of a garbage container of the present invention.
Figure 7:
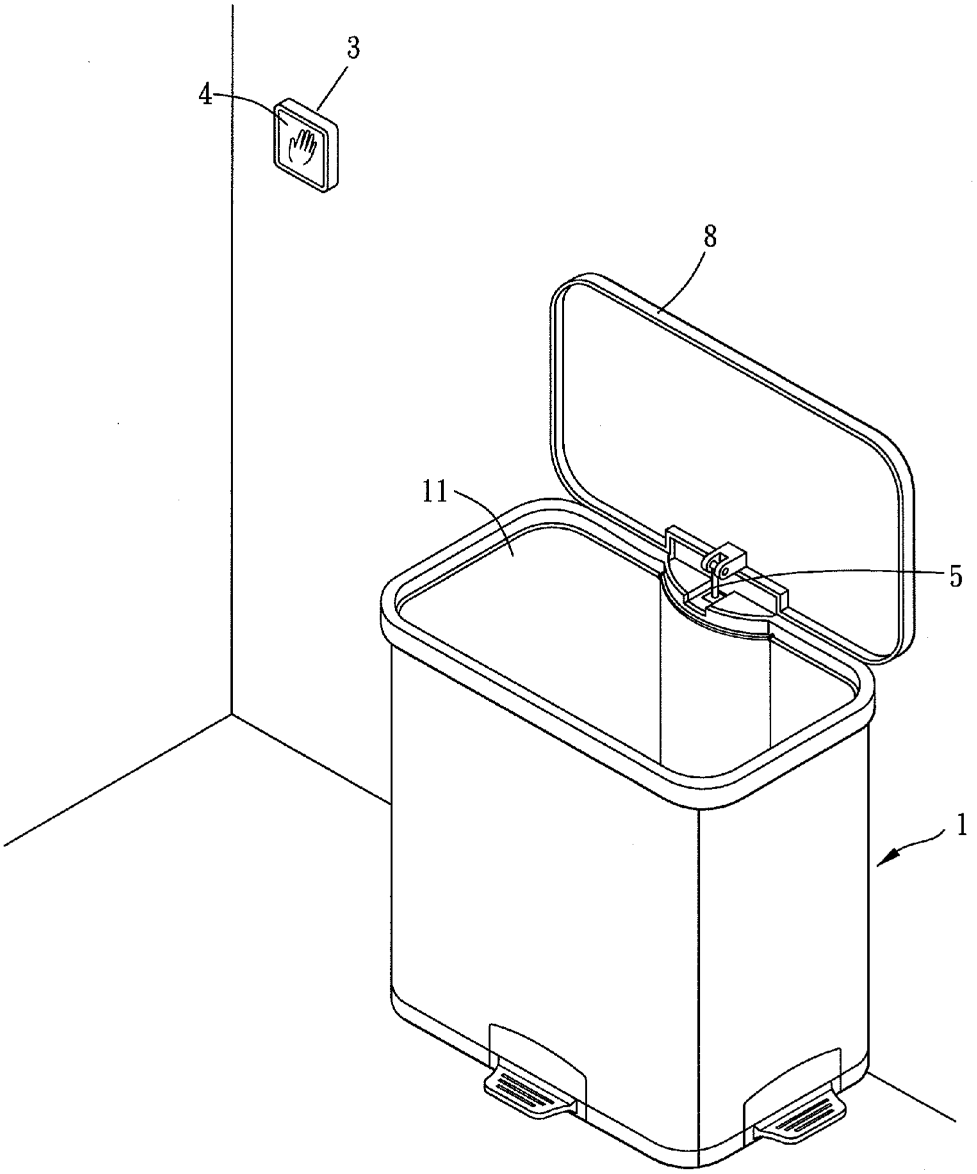
FIG. 7 is an illustration showing a third embodiment of a garbage container of the present invention.
Figure 8:
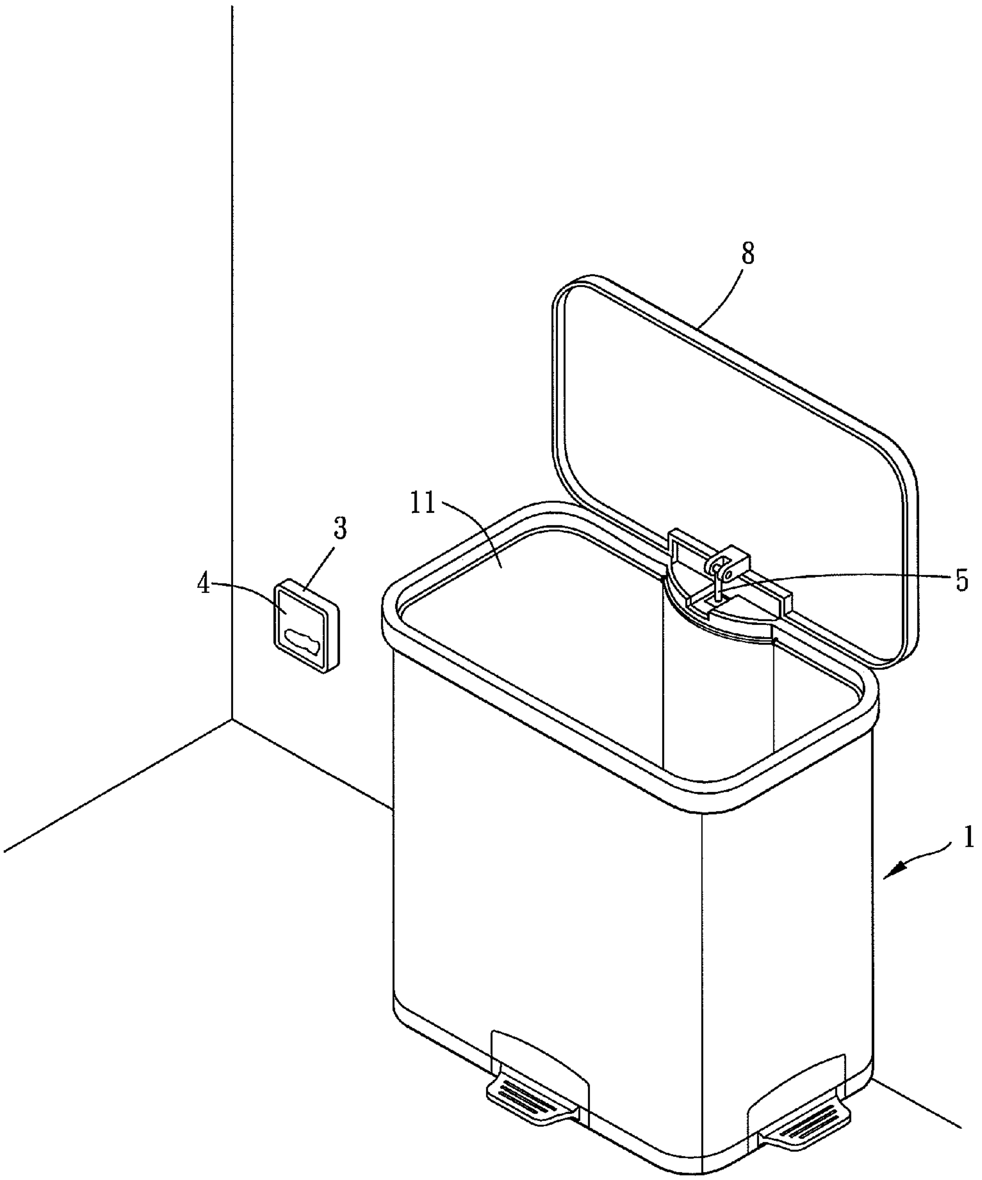
FIG. 8 is an illustration showing a forth embodiment of a garbage container of the present invention.

Besides, the sensor 3 and the pedal 4 can be placed at a position outside of the main body 1 to facilitate operation. In a second embodiment of the present invention, referring to FIG. 6, when no enough space at periphery of the main body 1 can be used to dispose the pedal 4, the sensor 3 and the pedal 4 can be disposed at a more appropriate position. When the pedal 4 is pressed or stepped on, the resistance of the sensor 3 changes, and the sensor 3 sends a signal to the controller 2 to trigger the lid 8 to open by wires or by other wireless way. In a second and a third embodiments, referring to FIG. 7 and FIG. 8, the sensor 3 and the pedal 4 can be disposed on a wall. The pedal 3 can be pressed by hand or hit by feet to trigger the lid 8 to open. Also, pets and children can be prevented from opening the lid 8 accidentally.

To sum up, the garbage container of the present invention has a plurality of advantages listed below.

1. The operation is similar with conventional garbage containers, but a user doesn't have to keep stepping on the pedal anymore.
2. The resistance-type sensor is sensitive, so a user doesn't have to step on the pedal hard to open a heavy lid.
3. Comparing to the automatic garbage containers by induction, the garbage container of the present invention don't have larger sensor and control mechanism, so a larger receiving opening is provided.
4. Comparing to the automatically garbage containers by induction which detects anytime and consumes electricity anytime, the garbage container of the present invention operates only when the pedal is pressed or stepped on to save energy.

What is claimed is:

1. A garbage container, including;

a main body, a receiving opening being formed on a top of the main body;

a controller, being disposed on a bottom of the main body;

at east one sensor, being able to be changed in resistance when the sensor is under a change of pressure, the sensor being able to send signals to the controller when the sensor is changed in resistance and the resistance is larger than a predetermined value;

at least one pedal, the pedal contacting with the sensor, pressure the sensor receives being changed when the pedal is pressed;

a connecting member, being able to move between a first position near ground and a second position away from ground;

a driving mechanism, being able to drive the connecting member to elevate or descend when receiving a signal from the controller;

a power supply, providing power to the controller and the driving mechanism;

a lid, being disposed outside of the receiving opening and being able to pivot relatively to the receiving opening, a position of fringe of the lid connecting to an end of the connecting member, the lid covering the receiving opening to segregate the receiving opening from an external space when the connecting member is at the first position, the lid pivoting away from the receiving opening to enable the receiving opening to communicate with the external space when the connecting member is at the second position;

wherein the sensor is disposed in the main body, an opening is formed on a wall of the main body near a bottom of the main body, an end of the pedal is arranged through the opening to contact with the sensor.

2. The garbage container of claim 1, wherein the pedal is detachably inserted into the opening and the sensor.

3. The garbage container of claim 1, having pluralities of sensors and pluralities of pedals corresponding to the sensors, the main body forming pluralities of openings to enable the sensors and the pedals to be disposed on at least one side of the main body.

4. The garbage container of claim 1, wherein the sensor and the pedal are disposed on a wall outside of the main body.

5. The garbage container of claim 1, wherein the sensor and the pedal are disposed on a ground outside the main body.

6. The garbage container of claim 1, wherein the driving mechanism includes a motor, a decelerating mechanism, and an arm, an end of the arm rotatably connects to the decelerating mechanism, another end of the arm connects to the connecting member, the arm is able to pivot when being driven by the motor and the decelerating mechanism to enable the connecting member to move between the first and the second positions.

7. The garbage container of claim 1, wherein the power supply is a battery assembly.

8. The garbage container of claim 1, wherein the main body has a first room and a second room which are segregate from each other, the first room communicating with the receiving opening, the controller, the connecting member, the driving mechanism, and the power supply are located in the second room.

* * * * *